United States Patent
Jan et al.

(10) Patent No.: US 6,982,074 B2
(45) Date of Patent: *Jan. 3, 2006

(54) HIGH SILICA ZEOLITES: UZM-5HS

(75) Inventors: Deng-Yang Jan, Elk Grove Village, IL (US); Jaime G. Moscoso, Mount Prospect, IL (US); Gregory J. Lewis, Mount Prospect, IL (US); Michael G. Gatter, Elk Grove Village, IL (US); Beckay J. Mezza, Arlington Heights, IL (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 274 days.

This patent is subject to a terminal disclaimer.

(21) Appl. No.: 10/251,590

(22) Filed: Sep. 20, 2002

(65) Prior Publication Data

US 2004/0167370 A1 Aug. 26, 2004

(51) Int. Cl.
*C01B 39/06* (2006.01)

(52) U.S. Cl. ............... 423/713; 423/714; 423/715; 423/718; 502/85; 502/86; 208/46

(58) Field of Classification Search ............ 423/713, 423/714, 715, 718; 502/85, 86; 208/46
See application file for complete search history.

(56) References Cited

U.S. PATENT DOCUMENTS

| | | | | | |
|---|---|---|---|---|---|
| 3,130,007 | A | * | 4/1964 | Breck | 423/711 |
| 3,972,983 | A | * | 8/1976 | Ciric | 423/705 |
| 4,503,023 | A | | 3/1985 | Breck, et al. | 423/328 |
| 4,879,103 | A | * | 11/1989 | Vaughan | 423/705 |
| 4,996,034 | A | | 2/1991 | Skeels | 423/328 |
| 5,304,601 | A | * | 4/1994 | Des Courieres et al. | 502/66 |
| 5,308,814 | A | * | 5/1994 | Kukes et al. | 502/66 |
| 6,054,113 | A | * | 4/2000 | Vaughan et al. | 423/713 |
| 6,388,159 | B1 | | 5/2002 | Jan et al. | 585/481 |
| 6,613,302 | B1 | * | 9/2003 | Moscoso et al. | 423/718 |
| 2003/0211034 | A1 | | 11/2003 | Wilson et al. | 423/713 |

* cited by examiner

*Primary Examiner*—David Sample
(74) *Attorney, Agent, or Firm*—John G. Tolomei; Frank S. Molinaro

(57) ABSTRACT

A family of crystalline aluminosilicate zeolites designated UZM-5HS and derived from UZM-5 have been synthesized. The aluminum content of the UZM-5HS is lower than that of the starting UZM-5 thus changing its ion exchange capacity and acidity. These UZM-5HS are represented by the empirical formula:

$$M1_a^{n+}Al_{(1-x)}E_xSi_yO_z$$

and are prepared by treatments such as acid extraction and AFS treatments.

61 Claims, No Drawings

HIGH SILICA ZEOLITES: UZM-5HS

FIELD OF THE INVENTION

This invention relates to a family of related crystalline aluminosilicate UZM-5HS zeolites, which are derived from UZM-5 zeolites. The aluminum content of the UZM-5HS is lower than that of the starting UZM-5 thus changing its ion exchange capacity and acidity.

BACKGROUND OF THE INVENTION

Zeolites are crystalline aluminosilicate compositions which are microporous and which are formed from corner sharing $AlO_2$ and $SiO_2$ tetrahedra. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

The number of synthetic zeolites is well over a hundred as evidenced by the *Atlas of Zeolite Framework Types* published by the Structure Commission of the International Zeolite Association (IZA). As is well known, zeolites are distinguished from each other on the basis of their composition, crystal structure, catalytic and adsorption properties. One method commonly used in the art to distinguish zeolites is x-ray diffraction.

UZM-5 zeolites are a family of zeolites which are described in U.S. Pat. No. 6,613,302 B1 and U.S. Pat. No. 6,388,159 B1, which are incorporated by reference in their entirety. The UZM-5 zeolitic compositions have a unique x-ray diffraction pattern and have an empirical formula on an anhydrous basis in terms of molar ratios of:

$$M_m^{n+}R_r^{p+}Al_{(1-x)}E_xSi_yO_z$$

where M is at least one exchangeable cation selected from the group consisting of alkali and alkaline earth metals, m is the mole ratio of M to (Al+E) and varies from about 0 to about 1.2. R is a nitrogen-containing organic cation selected from the group consisting of quaternary ammonium ions, protonated amines, protonated diamines, protonated alkanolamines, quaternary alkanolammonium ions, diquaternary ammonium ions, and mixtures thereof, r is the mole ratio of R to (Al+E) and has a value of about 0.25 to about 3.0, E is an element selected from the group consisting of Ga, Fe, and B, x is the mole fraction of E and varies from 0 to about 0.5, n is the weighted average valence of M and has a value of +1 to about +2, p is the weighted average valence of R and has a value of +1 to about +2, y is the mole ratio of Si to (Al+B) and varies from about 5 to about 12, and z is the mole ratio of O to Al and has a value determined by the equation:

$$z=(m\cdot n+r\cdot p+3+4\cdot y)/2$$

Specific members of this family of zeolites are UZM-5 and UZM-5P.

Applicants have now modified these UZM-5 materials in order to change some of their properties. By using one or more of acid extracting, calcination, steaming and ammonium hexafluorosilicate treatment, applicants have been able to control the aluminum content of the UZM-5 zeolites to nearly all silica while maintaining their structure and porosity. Control of the Al composition in the zeolite allows one to tune the properties associated with the Al, such as ion-exchange capacity and acidity thereby providing improved catalysts and/or adsorbents. This new family of materials are designated UZM-5HS.

SUMMARY OF THE INVENTION

As stated, the present invention relates to crystalline microporous aluminosilicate zeolite designated UZM-5HS which are derived from UZM-5 zeolites. Accordingly, one embodiment of the invention is a microporous crystalline zeolite having a three-dimensional framework of at least $AlO_2$ and $SiO_2$ tetrahedral units and an empirical composition on an anhydrous basis in terms of mole ratios of the elements of:

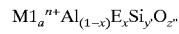

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.15 to about 50, E is an element selected from the group consisting of gallium, iron, boron, chromium, indium and mixtures thereof, x is the mole fraction of E and varies from 0 to about 0.5, n is the weighted average valence of M1 and has a value of about +1 to about +3, y' is the mole ratio of Si to (Al+E) and is greater than about 5 and z" is the mole ratio of O to (Al+E) and has a value determined by the equation:

$$z''=(a\cdot n+3+4\cdot y')/2$$

the zeolite characterized in that it has at least two x-ray diffraction peaks, one at a d-spacing of 3.84±0.07 Å and one at a d-spacing of 8.55±0.25 Å.

Another embodiment of the invention is a process for preparing a modified microporous crystalline zeolite having a three-dimensional framework of at least $AlO_2$ and $SiO_2$ tetrahedral units and an empirical composition on an anhydrous basis in terms of mole ratios of the elements of:

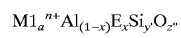

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.15 to about 50, E is an element selected from the group consisting of gallium, iron, boron, chromium, indium and mixtures thereof, x is the mole fraction of E and varies from 0 to about 0.5, n is the weighted average valence of M1 and has a value of about +1 to about +3, y' is the mole ratio of Si to (Al+E) and is greater than about 5 and z" is the mole ratio of O to (Al+E) and has a value determined by the equation:

$$z''=(a\cdot n+3+4\cdot y')/2$$

the material characterized in that it has at least two x-ray diffraction peaks, one at a d-spacing of 3.84±0.07 Å and one at a d-spacing of 8.55±0.25 Å, the process comprising treating a starting zeolite at treating conditions thereby removing at least a portion of the framework aluminum and optionally inserting silicon into the framework to provide the modified zeolite; the starting zeolite having an empirical formula on an anhydrous basis of:

$$M'^{n+}_{m'}R_r^{p+}Al_{(1-x)}E_xSi_yO_z$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 3.0, R is an organic cation selected from the group consisting of protonated amines, protonated diamines, protonated alkanolamines, quaternary ammonium ions, diquarternary ammonium ions, quaternized alkanolammonium ions and mixtures thereof, p is the average weighted valence of the organic cation and varies from about +1 to about +2, r' is the mole ratio of R to (Al+E) and varies from about 0 to about 3.0, y is the ratio of Si to (Al+E) and varies from about 5 to about 12 and z' is the mole ratio of O to (Al+E) and has a value given by the equation:

$$z'=(m' \cdot n + r' \cdot p + 3 + 4 \cdot y)/2.$$

Among the treating steps which can be used are: treatment with a fluorosilicate solution or slurry whereby framework aluminum atoms of the starting zeolite are removed and replaced by extraneous silicon atoms; extraction with a weak, strong, or complexing acid and calcination or steaming followed by ion-exchange or acid extraction.

These and other objects and embodiments will become more apparent after a detailed description of the invention.

DETAILED DESCRIPTION OF THE INVENTION

The aluminosilicate zeolites (UZM-5HS) of the invention and substituted versions of the same have a unique structure related to UZM-5. UZM-5HS is obtained by treating a starting zeolite having the topology of UZM-5 with: a) a fluorosilicate solution or slurry; b) calcination or steaming followed by acid extraction or ion-exchange; c) acid extraction or d) any combination of these processes in any order. UZM-5 is described in U.S. Pat. Nos. 6,613,302 B1 and 6,388,159 B1, the contents of which are incorporated in their entirety by reference. As described in U.S. Pat. No. 6,388,159 B1, UZM-5 has a composition in the as-synthesized form on an anhydrous basis expressed by the empirical formula:

$$M_m^{n+}R_r^{p+}Al_{(1-x)}E_xSi_yO_z \qquad (1)$$

where M is at least one exchangeable cation and is selected from the group consisting of alkali and alkaline earth metals. Specific examples of the M cations include but are not limited to lithium, sodium, potassium, cesium, strontium, calcium, magnesium, barium and mixtures thereof. The value of m which is the mole ratio of M to (Al+B) varies from 0 to about 1.2. R is a nitrogen containing organic cation and is selected from the group consisting of protonated amines, protonated diamines, protonated alkanolamines, quaternary ammonium ions, diquarternary ammonium ions, quaternized alkanolammonium ions and mixtures thereof. The value of r which is the mole ratio of R to (Al+E) varies from about 0.25 to about 3.0. The value of n which is the weighted average valence of M varies from +1 to about +2. The value of p, which is the average weighted valence of the organic cation has a value from about +1 to about +2. E is an element which is tetrahedrally coordinated, is present in the framework and is selected from the group consisting of gallium, iron, boron, chromium, indium, and mixtures thereof. The value of x which is the mole fraction of E varies from 0 to about 0.5. The ratio of silicon to (Al+E) is represented by y which varies from about 5 to about 12, while the mole ratio of O to (Al+E) is represented by z and has a value given by the equation:

$$z=(m \cdot n + r \cdot p + 3 + 4 \cdot y)/2$$

When M is only one metal, then the weighted average valence is the valence of that one metal, i.e. +1 or +2. However, when more than one M metal is present, the total amount of $$M_m^{n+}=M_{m1}^{(n1)+}+M_{m2}^{(n2)+}+M_{m3}^{(n3)+}+$$

and the weighted average valence n is given by the equation:

$$n = \frac{m_1 \cdot n_1 + m_2 \cdot n_2 + m_3 \cdot n_3 + \ldots}{m_1 + m_2 + m_3 \ldots}$$

Similarly when only one R organic cation is present, the weighted average valence is the valence of the single R cation, i.e., +1 or +2. When more than one R cation is present, the total amount of R is given by the equation.

and the weighted average valence p is given by the equation $$p = \frac{p_1 \cdot r_1 + p_2 \cdot r_2 + p_3 \cdot r_3 + \ldots}{r_1 + r_2 + r_3 + \ldots}$$

These aluminosilicate zeolites, are prepared by a hydrothermal crystallization of a reaction mixture prepared by combining reactive sources of M, R, aluminum, and silicon in aqueous media. Accordingly, the aluminum sources include, but are not limited to, aluminum alkoxides, precipitated alumina, aluminum hydroxide, aluminum salts and aluminum metal. Specific examples of aluminum alkoxides include, but are not limited to aluminum sec-butoxide, and aluminum isopropoxide. Sources of silica include but are not limited to tetraethylorthosilicate, fumed silicas, precipitated silicas and colloidal silica. Sources of the M metals include the halide salts, nitrate salts, acetate salts, and hydroxides of the respective alkali or alkaline earth metals. When R is a quaternary ammonium cation, the sources include the hydroxide, carbonate, acetate and halide compounds. Specific examples include without limitation tetramethylammonium hydroxide, tetraethylammonium hydroxide, hexamethonium bromide, tetramethylammonium chloride, methyltriethylammonium hydroxide and tetramethylammonium carbonate. R may also be neutral amines, diamines, and alkanolamines. Specific examples are triethanolamine, triethylamine, and N,N,N',N'tetramethyl-1,6-hexanediamine.

The reaction mixture containing reactive sources of the desired components can be described in terms of molar ratios of the oxides by the formula:

where a is the mole ratio of the oxide of M and has a value of 0 to about 2, b is the mole ratio of the oxide of R and has a value of about 1.5 to about 30, d is the mole ratio of silica and has a value of about 5 to about 30, c is the mole fraction of the oxide of E and has a value from 0 to about 0.5, and e is the mole ratio of water and has a value of about 30 to about 6000. The reaction mixture is now reacted at a temperature of about 100° C. to about 175° C. and preferably from about 120° C. to about 150° C. for a period of about 12 hours to about 14 days and preferably for a time of about 2 days to about 6 days in a sealed reaction vessel under autogenous pressure. After crystallization is complete, the solid product is isolated from the heterogeneous mixture by means such as filtration or centrifugation, and then washed with de-ionized water and dried in air at ambient temperature up to about 100° C.

In this respect, the following species can be identified by their x-ray diffraction patterns having at least the d-spacing and relative intensities set forth in Tables B and C. As shown in the '860 application, the UZM-5 family of zeolites is characterized by having at least two peaks in the x-ray diffraction pattern: one peak at a d-spacing of about 3.9±0.12 Å and one peak at a d-spacing of about 8.6±0.20 Å. UZM-5P phases have been observed with peaks at d-spacing up to 40 Å under certain growth conditions. UZM-5 can be indexed on a tetragonal cell with a=12.4 Å and c=28.6 Å. Based on a tetragonal cell the 8.6 Å and 3.9 Å peaks have indices of 110 and 310 respectively.

TABLE B

UZM-5

| 2-Theta | d(Å) | I/I$_o$ % |
|---|---|---|
| 6.31–5.89 | 14.00–15.00 | m |
| 7.96–7.58 | 11.10–11.65 | m-s |
| 10.40–10.01 | 8.50–8.83 | w-m |
| 12.11–11.59 | 7.30–7.63 | m |
| 16.10–15.53 | 5.50–5.70 | m-vs |
| 19.28–18.55 | 4.60–4.78 | w-m |
| 22.26–21.60 | 3.99–4.11 | m |
| 23.20–22.43 | 3.83–3.96 | w-s |
| 24.16–23.33 | 3.68–3.81 | vs |
| 30.48–29.55 | 2.93–3.02 | w-m |
| 31.94–30.92 | 2.80–2.89 | w-m |
| 44.83–43.47 | 2.02–2.08 | w |

TABLE C

UZM-5P

| 2-Theta | d(Å) | I/I$_o$ % |
|---|---|---|
| <6.31 | >14.00 | w-vs |
| 7.96–7.68 | 11.10–11.50 | w-m |
| 10.52–10.04 | 8.40–8.80 | m-s |
| 16.56–15.67 | 5.35–5.65 | w-m |
| 19.49–18.87 | 4.55–4.70 | w-m |
| 23.52–22.09 | 3.78–4.02 | w-vs |
| 24.03–23.39 | 3.70–3.80 | w-m |
| 30.81–29.76 | 2.90–3.00 | w-m |
| 31.94–30.81 | 2.80–2.90 | w-m |
| 45.30–43.04 | 2.00–2.10 | w-m |

The cation population of the starting UZM-5 is not a critical factor of the instant process insofar as the dealumination processes are concerned, but can have a bearing on the final result, especially with regard to the extent of dealumination. Thus, the UZM-5 can be used as synthesized or can be ion exchanged to provide a different cation form. In this respect, the starting zeolite can be described by the empirical formula:

$$M'_{m'}{}^{n'+}R_{r'}{}^{p+}Al_{(1-x)}E_xSi_yO_{z'} \qquad (2)$$

where R, x, y, and E are as described above and m' has a value from 0 to about 3.0, M' is a cation selected from the group consisting of alkali metals, alkaline earth metals, rare earth metals, hydrogen ion, ammonium ion, and mixtures thereof, n' is the weighted average valence of M' and varies from about 1 to about 3, r' has a value from about 0 to about 3.0, and p is the weighted average valence of R and varies from about +1 to +2. The value of z' is given by the formula:

$$z'=(m'·n'+r'·p+3+4·y)/2.$$

The designation UZM-5 will be used to refer to the zeolite represented by formula (2) which includes both the as-synthesized and ion exchanged forms of the zeolite.

Methods used to exchange one cation for another are well known in the art and involve contacting the microporous compositions with a solution containing the desired cation (at molar excess) at exchange conditions. Exchange conditions include a temperature of about 15° C. to about 100° C. and a time of about 20 minutes to about 50 hours. The organic cation can also be removed prior to ion exchange by heating under controlled conditions. A special case of ion-exchange is ammonia calcination, in which the organic template can be decomposed and replaced by ammonium cation.

In a preferred case, especially for dealumination by treatment with a fluorosilicate solution, the UZM-5 is exchanged with ammonium cation by contacting it with ammonium nitrate at a temperature of 15° C. to about 100° C., followed by a water wash. This procedure may be repeated several times. Finally, the exchanged UZM-5 zeolite is dried at 100° C.

One process of preparing the UZM-5HS of the present invention is by treating the UZM-5 composition described above with a fluorosilicate salt at a temperature of about 20° C. to about 90° C. The fluorosilicate salt serves two purposes. It removes aluminum atoms from the framework and provides a source of extraneous silicon, which can be inserted into the framework (replacing the aluminum). The fluorosilicate salts which can be used are described by the general formula:

$$A_{2/n}SiF_6$$

where n is the valence of A and A is a cation selected from the group consisting of NH$_4^+$, H$^+$, Mg$^{2+}$, Li$^+$, Na$^+$, Ba$^{2+}$, Cd$^{2+}$, Cu$^+$, Cu$^{2+}$, Ca$^{2+}$, Cs$^+$, Fe$^{2+}$, Ca$^{2+}$, Pb$^{2+}$, Mn$^{2+}$, Rb$^+$, Ag$^+$, Sr$^{2+}$, Tl$^+$, and Zn$^{2+}$. The ammonium fluorosilicate is most preferred because of its substantial solubility in water and because it forms water soluble by-product salts upon reaction with the zeolite, namely (NH$_4$)$_3$AlF$_6$.

The fluorosilicate salt is contacted with the UZM-5 zeolite in the form of an aqueous solution or slurry at a pH in the range of about 3 to about 7. This solution is contacted with the zeolite either incrementally or continuously at a slow rate such that a sufficient proportion of the framework aluminum atoms removed are replaced by silicon atoms to retain at least 50%, preferably at least 70% of the framework (crystalline) structure of the starting UZM-5 zeolite. The amount of fluorosilicate necessary to carry out the process of this invention can vary considerably, but should be at least in an amount of 0.0075 moles of the fluorosilicate salt per 100 grams of starting zeolite. Once the reaction is complete, the product zeolite UZM-5HS is isolated by conventional techniques such as filtration.

Without wishing to be bound to any particular theory, the process of removing aluminum and inserting the silicon appears to proceed in two steps in which the aluminum extraction step will, unless controlled, proceed very rapidly while the silicon insertion is relatively slow. If dealumination becomes too extensive without silicon substitution, the crystal structure becomes seriously degraded and ultimately collapses. In general, the rate of aluminum extraction is decreased as the pH of the fluorosilicate solution in contact with the zeolite is increased within the range of about 3 to about 7 and as the concentration of the fluorosilicate in the reaction system is decreased. At pH values below 3, crystal degradation can be unduly severe, whereas at pH values higher than 7, silicon insertion is unduly slow. Also, increasing the reaction temperature tends to increase the rate of substitution of silicon. Increasing the reaction temperature has been found to have less of an effect on dealumination than the pH of the solution. Therefore, the pH may be considered a means of controlling the dealumination while temperature may be considered as a means of controlling the substitution rate.

Theoretically, there is no lower limit for the concentration of fluorosilicate salt in the aqueous solution employed, provided, of course, the pH of the solution is high enough to avoid undue destructive attack on the UZM-5 zeolite structure apart from the intended reaction with the fluorosilicate. A slow rate of addition of fluorosilicate salts insures that adequate time is permitted for the insertion of silicon into the framework before excessive aluminum extraction occurs with consequent collapse of the crystal structure. In general the effective reaction temperature is between about 10° C. and 99° C., preferably between about 20° C. and 95° C., but temperatures of 125° C. or higher and as low as 0° C. can be used.

The maximum concentration of fluorosilicate salt in the aqueous solution employed is, of course, interrelated to the temperature and pH factors and also with the time of contact between the zeolite and the solution and the relative proportions of zeolite and fluorosilicate salt. Solutions having fluorosilicate salt concentrations of between $10^{-3}$ moles per liter of solution and up to saturation of the solution can be employed, but it is preferred that concentrations in the range of between about 0.05 and about 2.0 moles per liter of solution be used. In addition, as hereinbefore discussed, slurries of the fluorosilicate salts may be employed. The aforementioned concentration values are with respect to true solutions, and are not intended to apply to the total fluorosilicate salts in slurries of the salts in water. Even very slightly soluble fluorosilicate salts can be slurried in water and used as a reagent, the undissolved solids being readily available to replace dissolved molecular species consumed in reaction with the zeolite. The minimum value for the amount of fluoro salt to be added is preferably at least equivalent to the minimum mole fraction of aluminum to be removed from the zeolite.

It has been found that when large amounts of silicon atoms are to be substituted, i.e., increasing the $SiO_2/Al_2O_3$ ratio by more than 100%, it is preferable to carry out the process in multiple steps in order to minimize crystal degradation. As the amount of silicon that is substituted into the framework is substantially increased (beyond 100% increase) it may actually be necessary to carry out the process in two or more steps in order to prevent excessive degradation of the crystalline structure. That is, contacting with the fluorosilicate salt is carried out in two or more steps using a lower concentration of the fluorosilicate salt than required to replace the desired amount of silicon in one step. After each fluorosilicate treatment, the product is washed to remove fluoride and aluminum. Drying of the zeolite at 50° C. between treatments may also be done to facilitate the handling of the wet zeolite product.

Another embodiment of the invention involves contacting the UZM-5 starting zeolite with an acid (acid extraction) in order to remove some of the aluminum from the framework and thereby provide the UZM-5HS zeolite of the invention. Although it is known that aluminum can be extracted from the framework by acids, it is not predictable whether the resulting product will retain a substantial portion of its crystallinity or whether the structure will collapse resulting in an amorphous material. Applicants have discovered that UZM-5 can be dealuminated to nearly pure silica forms while maintaining substantial crystallinity, surface area and micropore volume.

The acids which can be used in carrying out acid extraction include without limitation mineral acids, carboxylic acids and mixtures thereof. Examples of these include sulfuric acid, nitric acid, ethylene diaminetetraacetic acid (EDTA), citric acid, oxalic acid, etc. The concentration of acid which can be used is not critical but is conveniently between about 1 wt. % to about 80 wt. % acid and preferably between 5 wt. % and 40 wt. % acid. Acid extraction conditions include a temperature of about 10° C. to about 100° C. for a time of about 10 minutes to about 24 hours. Once treated with the acid, the UZM-5HS zeolite is isolated by means such as filtration, washed with deionized water and dried at ambient temperature up to about 100° C.

The extent of dealumination obtained from acid extraction depends on the cation form of the starting UZM-5 as well as the acid concentration and the time and temperature over which the extraction is conducted. For example, if organic cations are present in the starting UZM-5, the extent of dealumination will be slight compared to a UZM-5 in which the organic cations have been removed. This may be preferred if it is desired to have dealumination just at the surface of the UZM-5. Convenient ways of removing the organic cations include calcination, ammonia calcination, steaming and ion exchange. Calcination conditions include a temperature of about 300° C. to about 600° C. for a time of about 2 to about 24 hours. Steaming conditions include a temperature of about 400° C. to about 850° C. with from about 1% to about 100% steam for a time of about 10 minutes to about 48 hours and preferably a temperature of about 500° C. to about 600° C., steam concentration of about 5 to about 50% and a time of about 1 to about 2 hours. Ion exchange conditions are as set forth above.

A special treatment for removing organic cations to obtain the ammonium ion exchanged form is ammonia calcination. Calcination in an ammonia atmosphere can decompose organic cations, presumably to a proton form that can be neutralized by ammonia to form the ammonium cation. The stability of the ammonium form of the zeolite prevents dealumination upon hydration, which occurs extensively in lower ratio zeolites in the proton forms obtained in air calcinations. The resulting ammonium form of the zeolite can be further ion-exchanged to any other desired form. Ammonia calcination conditions include treatment in the ammonia atmosphere at temperatures between about 250° C. and about 600° C. and more preferably between about 250° C. and about 450° C. for times of 10 minutes to 5 hours. Optionally, the treatments can be carried out in multiple steps within this temperature range such that the total time in the ammonia atmosphere does not exceed 5 hours. Above 500° C., the treatments should be brief, less than a half hour and more preferably on the order of 5–10 minutes. Extended calcination times above 500° C. can lead to unintended dealumination along with the desired ammonium ion-exchange and are unnecessarily harsh as most organoammonium templates easily decompose at lower temperatures.

It should be pointed out that both calcination and steaming treatments not only remove organic cations, but can also dealuminate the zeolite. Thus, alternate embodiments of the invention include: a calcination treatment followed by acid extraction and steaming followed by acid extraction. A further embodiment of the invention comprises calcining or steaming the starting UZM-5 zeolite followed by an ion-exchange treatment. Of course an acid extraction can be carried out concurrently with, before or after the ion exchange.

The ion exchange conditions are the same as set forth above, namely a temperature of about 15° C. to about 100° C. and a time of about 20 minutes to about 50 hours. Ion exchange can be carried out with a solution comprising a cation (M1') selected from the group consisting of alkali metals, alkaline earth metals, rare earth metals, hydrogen ion, ammonium ion, and mixtures thereof. By carrying out this ion exchange, the M1 cation is exchanged for a secondary or different M1' cation. In a preferred embodiment, the UZM-5HS composition after the steaming or calcining steps is contacted with an ion exchange solution comprising an ammonium salt. Examples of ammonium salts include but are not limited to ammonium nitrate, ammonium chloride, ammonium bromide, and ammonium acetate. The ammonium ion containing solution can optionally contain a mineral acid such as but not limited to nitric, hydrochloric, sulfuric and mixtures thereof. The concentration of the mineral acid is that amount necessary to give a ratio of $H^+$ to $NH_4^+$ of 0 to 1. This ammonium ion exchange aids in removing any debris present in the pores after the steaming and/or calcination treatments.

It is apparent from the foregoing that, with respect to effective process conditions, it is desirable that the integrity of the zeolite crystal structure be substantially maintained throughout the dealumination process, and that the zeolite retains at least 50%, preferably at least 70 and more preferably at least 90% of its original crystallinity. A convenient technique for assessing the crystallinity of the products relative to the crystallinity of the starting material is the comparison of the relative intensities of the d-spacing of their respective X-ray powder diffraction patterns. The sum of the peak intensities, in arbitrary units above the background, of the starting material is used as the standard and is compared with the corresponding peak intensities of the products. When, for example, the numerical sum of the peak heights of the molecular sieve product is 85 percent of the value of the sum of the peak intensities of the starting zeolite, then 85 percent of the crystallinity has been retained. In practice it is common to utilize only a portion of the peaks for this purpose, as for example, five or six of the strongest peaks. Other indications of the retention of crystallinity are surface area and adsorption capacity. These tests may be preferred when the substituted metal significantly changes, e.g., increases, the absorption of x-rays by the sample or when peaks experience substantial shifts such as in the dealumination process.

After having undergone any of the dealumination treatments as described above, the UZM-5HS is usually dried and can be used in various processes as discussed below. Applicants have found the properties of the UZM-5HS can be further modified by one or more additional treatment. These treatments include steaming, calcining or ion exchanging and can be carried out individually or in any combination. Some of these combinations include but are not limited to:

steam ⟶ calcine ⟶ ion exchange;
calcine ⟶ steam ⟶ ion exchange;
ion exchange ⟶ calcine ⟶ steam -continued ion exchange ⟶ steam ⟶ calcine;
steam ⟶ calcine;
calcine ⟶ steam, etc.

The dealumination treatment described above can be combined in any order to provide the zeolites of the invention although not necessarily with equivalent result. It should be pointed out that the particular sequence of treatments, e.g., AFS, acid extraction, steaming, calcining, etc can be repeated as many times as necessary to obtain the desired properties. Of course one treatment can be repeated while not repeating other treatments, e.g., repeating the AFS two or more times before carrying out steaming or calcining; etc. Finally, the sequence and/or repetition of treatments will determine the properties of the final UZM-5HS composition.

The UZM-5HS as prepared above is described by the empirical formula on an anhydrous basis of:

$$M1_a^{n+}Al_{(1-x)}E_xSi_{y'}O_{z''}$$

where M1 is at least one exchangeable cation selected from the group consisting of alkali, alkaline earth metals, rare earth metals, ammonium ion, hydrogen ion and mixtures thereof, a is the mole ratio of M1 to (Al+E) and varies from about 0.15 to about 50, n is the weighted average valence of M1 and has a value of about +1 to about +3, E is an element selected from the group consisting of gallium, iron, boron, chromium, indium and mixtures thereof, x is the mole fraction of E and varies from 0 to 0.5, y' is the mole ratio of Si to (Al+E) and varies from greater than about 5 to virtually (pure silica) and z" is the mole ratio of O to (Al+E) and has a value determined by the equation:

$$z''=(a·n+3+4·y')/2$$

the zeolite characterized in that it has at least two x-ray diffraction peaks, one at a d-spacing of 3.84±0.07 Å and one at 8.55±0.25 Å. The former peak is often very broad. By virtually pure silica is meant that virtually all the aluminum and/or the E metals have been removed from the framework. It is well know that it is virtually impossible to remove all the aluminum and/or E metal. Numerically, a zeolite is virtually pure silica when y' has a value of at least 3,000, preferably 10,000 and most preferably 20,000. Thus, ranges for y' are from 5 to 3,000 preferably greater than 12 to about 3,000; 5 to 10,000 preferably greater than 12 to about 10,000 and 5 to 20,000 preferably greater than 12 to about 20,000.

In specifying the proportions of the zeolite starting material or adsorption properties of the zeolite product and the like herein, the "anhydrous state" of the zeolite will be intended unless otherwise stated. The term "anhydrous state" is employed herein to refer to a zeolite substantially devoid of both physically adsorbed and chemically adsorbed water.

The UZM-5HS zeolite obtained after one or more of the above described treatments will have x-ray diffraction patterns which are different (and thus unique) from that of UZM-5. A list of the major peaks that are common to all the UZM-5HS materials is given in table A.

TABLE A

UZM-5HS

| 2-Θ | d(Å) | I/I₀ % |
|---|---|---|
| <6.79 | >13.0 | w-m |
| 8.26–7.52 | 10.70–11.75 | m-vs |
| 10.65–10.04 | 8.30–8.80 | m-vs |
| 12.32–11.79 | 7.18–7.50 | s-vs |
| 16.56–15.53 | 5.35–5.70 | m-vs |
| 19.71–18.78 | 4.50–4.72 | w-m |
| 23.58–22.72 | 3.77–3.91 | w-m |
| 24.37–23.64 | 3.65–3.76 | m-vs |

The zeolites of this invention are capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide and various hydrocarbons are provided in D. W. Breck, *Zeolite Molecular Sieves*, John Wiley and Sons (1974) p. 636. The separation of hydrocarbons based on molecular size is a preferred application.

The crystalline microporous compositions of the present invention either as synthesized or after calcination can be used as catalysts or catalyst supports in hydrocarbon conversion processes. Hydrocarbon conversion processes are well known in the art and include cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are alkylation of aromatics, isomerization of xylenes, naphtha cracking, and conversion of oxygenates to olefins.

Other reactions may be catalyzed by these crystalline microporous compositions, including base-catalyzed side chain alkylation of alkylaromatics, aldol-condensations, olefin double bond isomerization and isomerization of acetylenes, alcohol dehydrogenation, and olefin dimerization and oligomerization. Some of the reaction conditions and types of feeds that can be used in these processes are set forth in U.S. Pat. No. 5,015,796 and in H. Pines, THE CHEMISTRY OF CATALYTIC HYDROCARBON CONVERSIONS, Academic Press (1981) pp. 123–154 and references contained therein, which are incorporated by reference.

The X-ray patterns presented in the following examples (and tables above) were obtained using standard X-ray powder diffraction techniques. The radiation source was a high-intensity X-ray tube operated at 45 kV and 35 ma. The diffraction pattern from the copper K-alpha radiation was obtained by appropriate computer based techniques. Flat compressed powder samples were continuously scanned at 2° (2θ) per minute from 2° to 70° (2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_0$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacing, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacing are indicated by the notations vs, s, m and w which represent very strong, strong, medium, and weak, respectively. In terms of 100 X $I/I_0$, the above designations are defined as w=0–15; m=15–60; s=60–80 and vs=80–100. In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

UZM-5 Synthesis

Aluminum tri-sec-butoxide (95+%), 58.75 g, was dissolved in 836.34 g TEAOH (35%). Then 294.73 g colloidal silica (Ludox™ AS-40, 40% $SiO_2$) was added along with 10.18 g de-ionized water. The reaction mixture was stirred vigorously for an hour and placed in several teflon bottles and aged overnight at 95° C. An analysis of the resulting aluminosilicate mixture showed it to contain 4.67% Si.

A 400 g portion of this aluminosilicate mixture was treated with a TMACl solution (9.41 g TMACl (97%) in 20.0 g deionized water) and homogenized for 20 minutes. The reaction mixture was placed in 6 teflon-lined autoclaves and digested for 96 hr at 150° C. at autogenous pressures. The solid products were isolated by centrifugation, washed with de-ionized water and dried at 98° C.

The solid products from each autoclave were combined. Elemental analyses showed the Si/Al ratio to be 6.89. The BET surface area and micropore volume of the calcined material was 520 m²/g and 0.20 cc/g. The powder x-ray diffraction pattern showed that the material was UZM-5. Characteristic lines of the diffraction pattern are shown in Table 1.

TABLE 1

| 2-Θ | d(Å) | I/I₀ % |
|---|---|---|
| 6.12 | 14.43 | m |
| 7.70 | 11.47 | m |
| 10.04 | 8.80 | m |
| 11.80 | 7.49 | m |
| 15.62 | 5.67 | m-s |
| 16.06 | 5.51 | m |
| 18.98 | 4.67 | m |
| 21.74 | 4.08 | m |
| 22.70 | 3.91 | m |
| 23.56 | 3.77 | vs |
| 25.08 | 3.55 | w |

TABLE 1-continued

| 2-Θ | d(Å) | I/I₀ % |
|---|---|---|
| 26.12 | 3.41 | w |
| 27.14 | 3.28 | w |
| 29.62 | 3.01 | w-m |
| 29.98 | 2.98 | w |
| 31.26 | 2.86 | m |
| 32.98 | 2.71 | w |
| 34.32 | 2.61 | w |
| 43.94 | 2.06 | w |

EXAMPLE 2

A 12 gram sample of UZM-5 prepared similarly as in Example 1 was calcined in a vertical tube furnace configured with an upflow of ammonia. The ammonia flow rate was 1.1 l/min while the furnace was ramped using a 5° C./min ramp rate with 0.5 hr dwells at 300° C., 350° C. and 450° C. and a 6 minute dwell at 500° C. or 550° C. The sample was then cooled down to room temperature in the presence of flowing ammonia to make the Na, $NH_4$ UZM-5 form. The starting zeolite contained 100% tetrahedral Al as determined by NMR, 11.9% C, N/Al=1.32 and Na/Al=0.05, the nitrogen and carbon coming from the template. After the ammonia calcination procedure discussed above and employing a 500° C. treatment in the last step, the carbon level was reduced to 0.7%, N/Al=1.02, Na/Al=0.05, and the Al was shown to be nearly 100% tetrahedral by NMR. The resulting ammonium form of the zeolite maintains maximum ion-exchange capacity by keeping the aluminum in the framework, while also enhancing ion-exchange capability because the non-exchangeable template cations have been replaced by ammonium cations. From this composition, many variations of the zeolite are now attainable via ion-exchange before one begins the dealumination process.

EXAMPLE 3

A 10 g portion of the material from example 1 was calcined in the following manner. Under a $N_2$ atmosphere, the temperature was ramped to 300° C. at 2° C./min, held at 300° C. for 1.5 hr, ramped to 420° C. at 2° C./min, held for 1.5 hr, and ramped to 520° C./min at 2° C./min, and held for 1 hr under $N_2$, followed by conversion of the atmosphere to air and another 5.5 hr at 520° C. An acidic solution was prepared by diluting 2.4 g 98% $H_2SO_4$ in 80 g de-ionized water and heated to 75° C. The calcined material was added to this solution and stirred for 2 hr at 75° C. The product was isolated by filtration, washed with de-ionized water, and dried at 98° C.

Elemental analysis showed the product to have a Si/Al ratio of 31.7, while $N_2$ adsorption measurements yielded a BET surface area of 391 m²/g and a micropore volume of 0.13 cc/g. An x-ray diffraction pattern indicated the material to be UZM-5HS. Characteristic lines in the diffraction pattern are shown in Table 2.

TABLE 2

| 2-Θ | d(Å) | I/I₀ % |
|---|---|---|
| 6.52 | 13.54 | m |
| 8.06 | 10.96 | m-s |
| 10.48 | 8.43 | s-vs |
| 12.18 | 7.26 | vs |
| 16.26 | 5.45 | m |

TABLE 2-continued

| 2-Θ | d(Å) | I/I₀ % |
|---|---|---|
| 17.61 | 5.03 | w |
| 19.41 | 4.57 | w |
| 23.09 | 3.85 | w |
| 23.35 | 3.81 | w |
| 24.12 | 3.69 | m |

EXAMPLE 4

An 8.0 g portion of the UZM-5 isolated in example 1 was calcined in the following manner. Under a $N_2$ atmosphere, the temperature was ramped to 300° C. at 2° C./min, held at 300° C. for 2 hr, ramped to 420° C. at 2° C./min, held for 2 hr, and ramped to 520° C./min at 2° C./min, and held for 8 hr. An acidic solution was prepared by diluting 40.0 g $HNO_3$ (69%) in 100 g de-ionized water. The solution was heated to 75° C. before the calcined UZM-5 was added. The resulting suspension was stirred for 2 hr at 75° C. The product was isolated by filtration, washed with de-ionized water, and dried at 98° C.

Elemental analysis showed the product to have a Si/Al ratio of 89.4, while $N_2$ adsorption measurements indicated a BET surface area of 466 m²/g and a micropore volume of 0.16 cc/g. The x-ray diffraction pattern showed the product to be UZM-5HS, some of the characteristic lines of the pattern are shown in Table 3.

TABLE 3

| 2-Θ | d(Å) | I/I₀ % |
|---|---|---|
| 6.40 | 13.80 | m |
| 7.98 | 11.07 | vs |
| 10.36 | 8.53 | vs |
| 12.12 | 7.30 | vs |
| 14.62 | 6.05 | w |
| 16.00 | 5.53 | s |
| 17.48 | 5.07 | w |
| 19.36 | 4.58 | m |
| 20.74 | 4.28 | w |
| 22.28 | 3.99 | m |
| 22.96 | 3.87 | m |
| 23.27 | 3.82 | m |
| 24.04 | 3.70 | s |

EXAMPLE 5

A 5 g portion of UZM-5 from example 1 was calcined in the following manner. Under an $N_2$ atmosphere, the temperature was ramped to 550° C. at 3° C./min and held there for 6 hr. A solution was prepared by diluting 40 g $HNO_3$ (69%) in 110 g de-ionized water. The solution was heated to 75° C. before the calcined UZM-5 was added. The slurry was stirred at 75° C. for 4 hr. The product was isolated by filtration, washed with de-ionized water, and dried at 98° C.

Elemental analyses showed the product to have a Si/Al ratio of 60.6, while $N_2$ adsorption measurements indicated a BET surface area of 491 m²/g and a micropore volume of 0.18 cc/g. The x-ray diffraction pattern showed the product to be UZM-5HS, some of the characteristic lines of which are shown in Table 4.

TABLE 4

| 2-Θ | d(Å) | I/I₀ % |
|---|---|---|
| 6.32 | 13.97 | m |
| 7.94 | 11.13 | vs |
| 10.30 | 8.58 | s |
| 12.06 | 7.33 | s-vs |
| 14.65 | 6.04 | w |
| 15.88 | 5.58 | s |
| 17.44 | 5.08 | m |
| 19.30 | 4.60 | m |
| 20.76 | 4.28 | w |
| 21.66 | 4.10 | w |
| 22.76 | 3.90 | m |
| 23.14 | 3.84 | w |
| 24.02 | 3.70 | s |

EXAMPLE 6

A 6 g portion of the UZM-5 from example 1 was calcined by the procedure given in example 3. A solution was prepared by diluting 40 g HNO$_3$ (69%) in 60 g de-ionized water. The solution was heated to 75° C. before the addition of the calcined UZM-5. The resulting slurry was stirred for 6 hr at 75° C. The products were isolated by filtration, washed with de-ionized water, and dried at 98° C.

Elemental analyses showed the product to have a Si/Al ratio of 117, while N$_2$ adsorption measurements indicated a BET surface area of 489 m$^2$/g and a micropore volume of 0.17 cc/g. The x-ray diffraction pattern showed the product to be UZM-5HS with some of the characteristic lines shown in Table 5.

TABLE 5

| 2-Θ | d(Å) | I/I₀ % |
|---|---|---|
| 6.34 | 13.94 | m |
| 7.98 | 11.07 | vs |
| 10.36 | 8.53 | vs |
| 12.12 | 7.30 | s |
| 14.64 | 6.05 | w |
| 15.92 | 5.56 | m-s |
| 17.39 | 5.10 | w |
| 19.28 | 4.60 | m |
| 20.71 | 4.29 | w |
| 22.30 | 3.98 | m |
| 22.88 | 3.88 | m |
| 23.20 | 3.83 | m |
| 24.04 | 3.70 | s |

EXAMPLE 7

A 10 g portion of a UZM-5 sample (Si/Al=7.7) was calcined by ramping at 3° C./min to 560° C. under an N$_2$ atmosphere and held there for 1 hr before changing the atmosphere to air, where the calcination was continued for another 6 hr. A solution was prepared by diluting 60 g HNO$_3$ (69%) in 40 g de-ionized water. The solution was heated to 85° C. before adding the calcined UZM-5. The slurry was stirred for 4 hr at 85° C. The product was isolated by filtration, washed with de-ionized water, and dried at 95° C. for 1 hr. The dried cake was isolated and treated with a NaCl solution (10 g in 150 ml de-ionized water) at 75° C. for 1 hr. The solid was isolated by filtration, washed with hot de-ionized water, and dried at 95° C.

Elemental analyses showed the Si/Al ratio to be 317, while N$_2$ adsorption measurements gave a BET surface area of 469 m$^2$/g and a micropore volume of 0.16 cc/g. The x-ray diffraction pattern showed the product to be UZM-5HS, some of the characteristic lines are shown in Table 6.

TABLE 6

| 2-Θ | d(Å) | I/I₀ % |
|---|---|---|
| 6.24 | 14.15 | m |
| 7.80 | 11.32 | s |
| 10.22 | 8.65 | vs |
| 11.92 | 7.42 | s |
| 14.49 | 6.11 | w |
| 15.78 | 5.61 | vs |
| 17.41 | 5.09 | w |
| 19.14 | 4.63 | w |
| 22.60 | 3.93 | w-m |
| 22.99 | 3.87 | w |
| 23.90 | 3.72 | m |

EXAMPLE 8

Aluminum tri-sec-butoxide (95+%), 987.54 g was dissolved in 14058 g TEAOH (35%) with vigorous stirring. This was followed by the addition of 4954 g colloidal silica (Ludox™ AS-40, 40% SiO$_2$) and further vigorous stirring for a half hour. The reaction mixture was placed in a 22-liter flask equipped with a mechanical stirrer and condensers. The mixture was aged at 95° C. for 16 hr. The reaction mixture contained 4.72% Si after the aging process.

An 1100 g portion of this aluminosilicate reaction mixture was treated with a solution consisting of 6.78 g NaCl and 12.72 g TMACl (97%) dissolved in 150 g de-ionized water with vigorous stirring. After homogenizing for an hour, the resulting mixture was placed in a 2 liter Parr autoclave and digested at 150° C. for 72 hr at autogenous pressures. The product was isolated by filtration and washed with de-ionized water. Characterization by x-ray powder diffraction and elemental analysis showed this material to be UZM-5 of Si/Al ratio 5.88.

A 12 g portion of this UZM-5 was calcined according to the profile given in example 6. A solution was prepared by diluting 60 g HNO$_3$ (69%) in 40 g de-ionized water. The solution was heated to 85° C. before adding the calcined UZM-5. The slurry was stirred for 4 hr at 85° C. The product was isolated by filtration, washed with de-ionized water, and dried at 95° C. for 1 hr. The dried cake was isolated and treated with a NaCl solution (10 g NaCl in 150 ml de-ionized water) at 75° C. for 1 hr. The solid was isolated by filtration, washed with hot de-ionized water, and dried at 95° C.

Elemental analyses showed the Si/Al ratio to be 1479 and Na/Al=5.48, while N$_2$ adsorption measurements gave a BET surface area of 512 m$^2$/g and a micropore volume of 0.18 cc/g. The x-ray diffraction pattern showed the product to be UZM-5HS, some of the characteristic lines are shown in Table 7.

TABLE 7

| 2-Θ | d(Å) | I/I₀ % |
|---|---|---|
| 6.38 | 13.83 | w |
| 7.95 | 11.12 | vs |
| 10.32 | 8.56 | s |
| 12.10 | 7.31 | vs |
| 14.59 | 6.07 | w |
| 15.96 | 5.55 | m |
| 16.68 | 5.31 | w |
| 17.43 | 5.08 | w |
| 19.12 | 4.64 | w-m |
| 20.75 | 4.28 | w |

TABLE 7-continued

| 2-Θ | d(Å) | I/I₀ % |
|---|---|---|
| 22.33 | 3.98 | w |
| 23.24 | 3.82 | m |
| 24.05 | 3.70 | m |

EXAMPLE 9

A sample of UZM-5 (Si/Al=6.03) was pretreated at 300° C. for 10 hr under an $N_2$ atmosphere. The UZM-5 sample (3.6 g) was suspended in 30 g de-ionized water containing 3 g $NH_4NO_3$ and 9.59 g $HNO_3$ (69%), giving a 15/1 ratio of $HNO_3$/Al. The slurry was heated overnight at 80° C. with stirring in an oil bath. The solids were isolated by filtration, washed with de-ionized water, and dried at room temperature. The sample was then calcined at 500° C. in air.

Elemental analyses showed the Si/Al ratio to be 65.4, while $N_2$ adsorption measurements gave a BET surface area of 498 m²/g and a micropore volume of 0.19 cc/g. The x-ray diffraction pattern showed the product to be UZM-5HS, some characteristic lines given in Table 8.

TABLE 8

| 2-Θ | d (Å) | I/I₀ % |
|---|---|---|
| 6.43 | 13.74 | w |
| 8.02 | 11.01 | m |
| 10.42 | 8.48 | m |
| 12.16 | 7.27 | vs |
| 16.00 | 5.53 | s |
| 17.31 | 5.12 | w |
| 19.28 | 4.60 | w |
| 22.30 | 3.98 | w |
| 23.23 | 3.83 | w |
| 24.12 | 3.69 | m-s |

EXAMPLE 10

A sample of the UZM-5 prepared in example 9 (6.37 g, Si/Al=6.03, 21.3% volatiles) was suspended in a $HNO_3$ solution containing 32.4 g $HNO_3$ (69%) diluted with 50 g de-ionized water, giving a 30/1 ratio of $HNO_3$/Al. The slurry was heated 18 hr at 80° C. with stirring in an oil bath. The product was isolated by filtration, washed with de-ionized water, and dried at room temperature. The sample was then calcined for 4 hr at 500° C. in air.

Elemental analyses showed the Si/Al ratio to be 23.2, while $N_2$ adsorption measurements gave a BET surface area of 510 m²/g and a micropore volume of 0.20 cc/g. The x-ray diffraction pattern showed the product to be UZM-5HS, some characteristic lines are given in Table 9.

TABLE 9

| 2-Θ | d (Å) | I/I₀ % |
|---|---|---|
| 6.43 | 13.74 | w |
| 7.92 | 11.15 | m |
| 10.30 | 8.58 | m |
| 12.08 | 7.32 | vs |
| 15.98 | 5.54 | vs |
| 19.19 | 4.62 | w |
| 20.76 | 4.28 | w |
| 22.52 | 3.94 | w |
| 23.21 | 3.83 | w |
| 24.02 | 3.70 | m |

EXAMPLE 11

An ammonium hexafluorosilicate solution was prepared by dissolving 8.37 g $(NH_4)_2SiF_6$ in 159 g de-ionized water. Separately, an ammonium exchanged UZM-5 sample (150.55 g, Si/Al=5.45) was suspended in 395 g de-ionized water and heated to 80° C. The ammonium hexafluorosilicate solution was then added to the zeolite slurry at a rate of 1.34 cc/min using a pump over a period of 120 minutes. Once the addition was completed, the resulting reaction mixture was held at 80° C. for an hour. The product was isolated by filtration, washed with de-ionized water, and dried at room temperature.

Elemental analyses showed the Si/Al ratio to be 8.25, while $N_2$ adsorption showed the BET surface area to be 561 m²/g and the micropore volume to be 0.17 cc/g. The x-ray diffraction pattern showed the product to be UZM-5HS, some characteristic lines are given in Table 10.

TABLE 10

| 2-Θ | d (Å) | I/I₀ % |
|---|---|---|
| 6.02 | 14.68 | w |
| 7.69 | 11.49 | s |
| 10.28 | 8.60 | s |
| 11.94 | 7.41 | vs |
| 15.84 | 5.59 | m-s |
| 16.48 | 5.37 | w |
| 19.07 | 4.65 | w |
| 20.63 | 4.30 | w |
| 22.12 | 4.02 | m |
| 22.40 | 3.97 | m |
| 23.07 | 3.85 | w |
| 23.86 | 3.73 | vs |

We claim as our invention:

1. A microporous crystalline zeolite having a three-dimensional framework of at least $AlO_2$ and $SiO_2$ tetrahedral units and an empirical composition on an anhydrous basis in terms of mole ratios of the elements of:

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0 to about 50, E is an element selected from the group consisting of gallium, iron, boron, chromium, indium and mixtures thereof, x is the mole fraction of E and vanes from 0 to about 0.5, n is the weighted average valence of M1 and has a value of about +1 to about +3, y' is the mole ratio of Si to (Al+E) and is greater than about 5 and z'' is the mole ratio of O to (Al+E) and has a value determined by the equation:

$$z''=(a \cdot n+3+4 \cdot y')/2$$

the zeolite characterized in that it has at least two x-ray diffraction peaks, one at a d-spacing of 3.84±0.07 Å and one at a d-spacing of 8.55±0.25 Å, and has a tetragonal unit cell.

2. The zeolite of claim 1 characterized in that it has an x-ray powder diffraction pattern which contains at least the d-spacing and relative intensities of Table A.

3. The zeolite of claim 1 where M1 is selected from the group consisting of lithium, cesium, sodium, potassium, strontium, barium, calcium, magnesium, lanthanum, hydrogen ion, ammonium ion and mixtures thereof.

4. The zeolite of claim 1 where y' has a value from about 5 to about 20,000.

5. The zeolite of claim 4 where y' has a value from about 5 to about 3,000.

6. A process for preparing a modified microporous crystalline zeolite having a three-dimensional framework of at least AlO$_2$ and SiO$_2$ tetrahedral units and an empirical composition on an anhydrous basis in terms of mole ratios of the elements of:

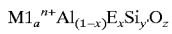

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0 to about 50, E is an element selected from the group consisting of gallium, iron, boron, chromium, indium and mixtures thereof; x is the mole fraction of E and varies from 0 to about 0.5, n is the weighted average valence of M and has a value of about +1 to about +3, y' is the mole ratio of Si to (Al+B) and is greater than about 5 and z" is the mole ratio of O to (Al+B) and has a value determined by the equation:

$$z''=(a\cdot n+3+4\cdot y')/2$$

the zeolite characterized in that it has at least two x-ray diffraction peaks, one at a d-spacing of 3.84±0.07 Å and one at a d-spacing of 8.55±0.25 Å, and has a tetragonal unit cell, the process comprising treating a starting zeolite at treating conditions thereby removing at least a portion of the framework aluminum and optionally inserting silicon into the framework to provide the modified zeolite; the starting zeolite having an empirical formula on an anhydrous basis of:

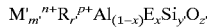

where M' is an exchangeable cation selected from the group consisting of ammonium ion, hydrogen ion, alkali metals, alkaline earth metals, rare earth metals and mixtures thereof, a is the weighted average valence of M' and varies from +1 to about +3, m' is the mole ratio of M' to (Al+E) and varies from 0 to about 3.0, R is an organic cation selected from the group consisting of protonated amines, protonated diamines, protonated alkanolamines, quaternary ammonium ions, diquarternary ammonium ions, quaternized alkanolammonium ions and mixtures thereof, p is the average weighted valence of the organic cation and varies from about +1 to about +2, r' is the mole ratio of R to (Al+B) and varies from about 0 to about 3.0, y' is the ratio of Si to (Al+E) and varies from about 5 to 12 and z' is the mole ratio of O to (Al+E) and has a value given by the equation:

$$z'=(m'\cdot n+r'\cdot p+3+4\cdot y)/2.$$

7. The process of claim 6 where the treating and treating conditions comprise contacting the starting zeolite with a fluorosilicate solution or slurry at a pH of about 3 to about 7, a temperature of about 10° C. to about 100° C. and a time sufficient to remove at least a portion of the aluminum from the framework and insert silicon into the framework and provide a modified zeolite.

8. The process of claim 6 where the treating and treating conditions comprise contacting the starting zeolite with an acid at a temperature of about 10° C. to about 100° C. for a time of about 10 minutes to about 24 hours.

9. The process of claim 6 where the treating and treating conditions comprise calcining a starting zeolite at a temperature of about 300° C. to about 600° C. for a time of about 2 to about 24 hours to provide a calcined zeolite and then contacting the calcined zeolite with an acid at a temperature of about 10° C. to about 100° C. for a time of about 10 minutes to about 24 hours to provide a modified zeolite.

10. The process of claim 6 where the treating and treating conditions comprise steaming a starting zeolite at a temperature of about 400° C. to about 850° C. with from about 1% to about 100% steam, for a time of about 10 minutes to about 48 hours to provide a steamed zeolite and then contacting the steamed zeolite with an acid at a temperature of about 10° C. to about 100° C. for a time of about 10 minutes to about 24 hours to provide a modified zeolite.

11. The process of claim 8 where the acid is selected from the group consisting of nitric acid, sulfuric acid, EDTA, citric acid, oxalic acid and mixtures thereof.

12. The process of claim 9 where the acid is selected from the group consisting of nitric acid, sulfuric acid, EDTA, citric acid, oxalic acid and mixtures thereof.

13. The process of claim 10 where the acid is selected from the group consisting of nitric acid, sulfuric acid, EDTA, citric acid, oxalic acid and mixtures thereof.

14. The process of claim 7 where the modified zeolite is further treated by steaming at steaming conditions which include a temperature of about 400° C. to about 850° C., a time of about 10 minutes to about 48 hours and a steam concentration of about 1% to about 100% to provide a steamed modified zeolite.

15. The process of claim 14 where the steamed modified zeolite is further treated by calcining at a temperature of about 300° C. to about 600° C. for a time of about 0.5 hours to about 24 hours to give a calcined steamed modified zeolite.

16. The process of claim 14 where the steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof and where the ion exchange conditions comprise a temperature of about 15° C. to about 100° C. and a time of about 20 minutes to about 50 hours.

17. The process of claim 15 where the calcined steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof and where the ion exchange conditions comprise a temperature of about 15° C. to about 100° C. and a time of about 20 minutes to about 50 hours.

18. The process of claim 7 where the modified zeolite is further treated by calcining at a temperature of about 300° C. to about 600° C. for a time of about 0.5 to about 24 hours to give a calcined modified zeolite.

19. The process of claim 18 where the calcined modified zeolite is steamed at a temperature of about 400° C. to about 850° C., a time of about 10 minutes to about 4 hours and a steam concentration of about 1% to about 100% to give a steamed calcined modified zeolite.

20. The process of claim 18 where the calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof and where the ion exchange conditions comprise a temperature of about 15° C. to about 100° C. and a time of about 20 minutes to about 50 hours.

21. The process of claim 19 where the steamed calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof and where the ion exchange conditions comprise a temperature of about 15° C. to about 100° C. and a time of about 20 minutes to about 50 hours.

22. The process of claim 7 where the modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

23. The process of claim 22 where the ion exchanged modified zeolite is further treated by steaming at steaming conditions which include a temperature of about 400° C. to about 850° C., a time of about 10 minutes to about 48 hrs. and a steam concentration of about 1% to about 100% to provide a steamed ion exchanged modified zeolite.

24. The process of claim 23 where the steamed ion exchange modified zeolite is further treated by calcining at a temperature of about 300° C. to about 600° C. for a time of about 0.5 hrs. to about 24 hrs. to give a calcined steamed ion exchanged modified zeolite.

25. The process of claim 22 where the ion exchanged modified zeolite is calcined at a temperature of about 300° C. to about 600° C. for a time of about 0.5 hrs. to about 24 hrs. to give a calcined ion exchanged modified zeolite.

26. The process of claim 25 where the calcined ion exchanged modified zeolite is steamed at steaming conditions which include a temperature of about 400° C. to about 850° C., a time of about 10 minutes to about 48 hours and a steam concentration of about 1% to about 100% to provide a steamed calcined ion exchanged modified zeolite.

27. The process of claim 6 where the treating and treating conditions comprise steaming a starting zeolite at a temperature of about 400° C. to about 850° C. with from about 1% to about 100% steam for a time of about 10 minutes to about 48 hours to provide a steamed zeolite and then ion exchanging the steamed zeolite by contacting it with a solution at ion exchange conditions, the solution comprising at least one cation selected from the group consisting of alkali metals, alkaline earth metals, rare earth metals, hydrogen ion, ammonium ion and mixtures thereof and where the ion exchange conditions comprise a temperature of about 15° C. to about 100° C. and a time of about 20 minutes to about 50 hours.

28. The process of claim 10 further comprising contacting the zeolite, after the treating, with a fluorosilicate solution or slurry at a pH of about 3 to about 7, a temperature of about 10° C. to about 100° C. and a time sufficient to remove at least a portion of the aluminum from the framework and insert silicon into the framework and provide a modified zeolite.

29. The process of claim 9 further comprising contacting the zeolite, after the treating, with a fluorosilicate solution or slurry at a pH of about 3 to about 7, a temperature of about 10° C. to about 100° C. and a time sufficient to remove at least a portion of the aluminum from the framework and insert silicon into the framework and provide a modified zeolite.

30. The process of claim 6 where the treating and treating conditions comprise calcining a starting zeolite at a temperature of about 300° C. to about 600° C. for a time of about 2 to about 24 hours to provide a calcined zeolite and then ion exchanging the calcined zeolite by contacting the calcined zeolite with a solution at ion exchange conditions, the solution comprising at least one cation selected from the group consisting of alkali metals, alkaline earth metals, rare earth metals, hydrogen ion, ammonium ion and mixtures thereof and where the ion exchange conditions comprise a temperature of about 15° C. to about 100° C. and a time of about 20 minutes to about 50 hours.

31. The process of claim 14 where the steamed modified zeolite is further treated by contacting the zeolite with an acid at a temperature of about 10° C. to about 100° C. for a time of about 10 minutes to about 24 hours to provide an extracted steamed modified zeolite.

32. The process of claim 15 where the calcined steamed modified zeolite is further treated by contacting the zeolite with an acid at a temperature of about 10° C. to about 100° C. for a time of about 10 minutes to about 24 hours to provide an acid extracted calcined steamed modified zeolite.

33. The process of claim 18 where the calcined modified zeolite is further treated by contacting the zeolite with an acid at a temperature of about 10° C. to about 100° C. for a time of about 10 minutes to about 24 hours to provide an acid extracted calcined steamed modified zeolite.

34. The process of claim 19 where the steamed calcined modified zeolite is further treated by contacting the zeolite with an acid at a temperature of about 10° C. to about 100° C. for a time of about 10 minutes to about 24 hours to provide an acid extracted steamed calcined zeolite.

35. The process of claim 23 where the steamed ion exchanged modified zeolite is further treated by contacting the zeolite with an acid at a temperature of about 10° C. to about 100° C. for a time of about 10 minutes to about 24 hours to provide an acid extracted steamed ion exchanged modified zeolite.

36. The process of claim 24 where the calcined steamed ion exchanged modified zeolite is further treated by contacting the zeolite with an acid at a temperature of about 10° C. to about 100° C. for a time of about 10 minutes to about 24 hours to provide an acid extracted calcined steamed ion exchanged modified zeolite.

37. The process of claim 25 in where the calcined ion exchanged modified zeolite is further treated by contacting the zeolite with an acid at a temperature of about 10° C. to about 100° C. for a time of about 10 minutes to about 24 hours to provide an acid extracted calcined ion exchanged modified zeolite.

38. The process of claim 26 where the steamed calcined ion exchanged modified zeolite is further treated by contacting the zeolite with an acid at a temperature of about 10° C. to about 100° C. for a time of about 10 minutes to about 24 hours to provide an acid extracted steamed calcined ion exchanged modified zeolite.

39. The process of claim 9 where the modified zeolite is steamed at steaming conditions which include a temperature of about 400° C. to about 850° C., a time of about 10 minutes to about 48 hours and a steam concentration of about 1% to about 100% to provide a steamed modified zeolite.

40. The process of claim 10 where the modified zeolite is calcined at a temperature of about 300° C. to about 600° C. for a time of about 0.5 hrs. to about 24 hrs. to give a calcined modified zeolite.

41. The process of claim 10 where the modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchanged modified zeolite and where the ion exchange conditions comprise a temperature of about 15° C. to about 100° C. and a time of about 20 minutes to about 50 hours.

42. The process of claim 9 where the modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

43. The process of claim 39 where the steamed modified zeolite is further treated by contacting the zeolite with an acid at a temperature of about 10° C. to about 100° C. for a time of about 10 minutes to about 24 hours to provide an acid extracted steam modified zeolite.

44. The process of claim 40 where the calcined modified zeolite is further treated by contacting the zeolite with an acid at a temperature of about 10° C. to about 100° C. for a time of about 10 minutes to about 24 hours to provide an acid extracted calcined modified zeolite.

45. The process of claim 40 where the calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

46. The process of claim 39 where the steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

47. The process of claim 43 where the acid extracted steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

48. The process of claim 44 where the acid extracted calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

49. The process of claim 31 where the acid extracted steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

50. The process of claim 32 where the acid extracted calcined steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

51. The process of claim 33 where the acid extracted calcined modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

52. The process of claim 34 where the acid extracted calcined steamed modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

53. The process of claim 35 where the acid extracted steamed ion exchanged modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

54. The process of claim 36 where the acid extracted calcined steamed ion exchanged modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

55. The process of claim 37 where the acid extracted calcined ion exchanged modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

56. The process of claim 38 where the acid extracted steamed calcined ion exchanged modified zeolite is further treated by ion exchanging at ion exchange conditions with a solution comprising a cation selected from the group consisting of alkali metals, alkaline earth metals, rare earth metals, hydrogen ion, ammonium ion and mixtures thereof to provide an ion exchange modified zeolite and where the ion exchange conditions comprise a temperature of about 15° C. to about 100° C. and a time of about 20 minutes to about 50 hours.

57. The process of claim 7 wherein before the treating, the starting zeolite is calcined under an ammonia atmosphere at a temperature of about 250° C. to about 600° C. for a time sufficient to produce the ammonium form of the zeolite.

58. The process of claim 8 wherein before the treating, the starting zeolite is calcined under an ammonia atmosphere at a temperature of about 250° C. to about 600° C. for a time sufficient to produce the ammonium form of the zeolite.

59. The process of claim 9 wherein before the treating, the starting zeolite is calcined under an ammonia atmosphere at a temperature of about 250° C. to about 600° C. for a time sufficient to produce the ammonium form of the zeolite.

60. The process of claim 10 wherein before the treating, the starting zeolite is calcined under an ammonia atmosphere at a temperature of about 250° C. to about 600° C. for a time sufficient to produce the ammonium form of the zeolite.

61. A hydrocarbon conversion process comprising contacting a hydrocarbon with a catalytic composite at hydrocarbon conversion conditions to give a converted product, the catalytic composite comprising a microporous crystalline zeolite having a three-dimensional framework of at least $AlO_2$ and $SiO_2$ tetrahedral units and an empirical composition on an anhydrous basis in terms of mole ratios of the elements of:

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0 to about 50, E is an element selected from the group consisting of gallium, iron, boron, chromium, indium and mixtures thereof, x is the mole fraction of E and varies from 0 to about 0.5, n is the weighted average valence of M1 and has a value of about +1 to about +3, y' is the mole ratio of Si to (Al+E) and is greater than about 5 and z'' is the mole ratio of O to (Al+E) and has a value determined by the equation:

$$z''=(a \cdot n+3+4 \cdot y')/2.$$

the zeolite characterized in that it has at least two x-ray diffraction peaks, one at a d-spacing of 3.84±0.07 Å and one at a d-spacing of 8.55±0.25 Å, and has a tetragonal unit cell.

* * * * *

UNITED STATES PATENT AND TRADEMARK OFFICE
CERTIFICATE OF CORRECTION

PATENT NO. : 6,982,074 B2  
APPLICATION NO. : 10/251590  
DATED : January 3, 2006  
INVENTOR(S) : Deng-Yang Jan et al.

Page 1 of 1

It is certified that error appears in the above-identified patent and that said Letters Patent is hereby corrected as shown below:

Column 19,
Lines 15, 16 and 43, replace "B" with -- E --.
Line 35, replace "a" with -- n --.
Line 48, replace "z' = (m'•n+r'•p+3+4•y)/2." with -- z'=(m'•n+r'•p+3+4•y')/2. --.

Signed and Sealed this

Twenty-seventh Day of June, 2006

JON W. DUDAS  
*Director of the United States Patent and Trademark Office*